United States Patent [19]

Divigard

[11] 3,738,609
[45] June 12, 1973

[54] TEMPERATURE COMPENSATED PNEUMATIC CONTROL SYSTEM

[75] Inventor: Albert J. Divigard, Waterbury, Conn.

[73] Assignee: Chandler Evans Inc., West Hartford, Conn.

[22] Filed: June 14, 1971

[21] Appl. No.: 152,898

[52] U.S. Cl. .................. 251/129, 91/367, 91/361, 91/419, 236/78
[51] Int. Cl. ........................ F15b 13/16, F16k 31/02
[58] Field of Search .................. 92/1; 91/419, 361; 137/90; 236/78

[56] References Cited
UNITED STATES PATENTS
3,521,535  7/1970  Oelrich .......................... 91/361 X
3,123,086  3/1964  Kleiss ............................ 137/90 X

*Primary Examiner*—Arnold Rosenthal
*Attorney*—Fishman & Van Kirk

[57] ABSTRACT

A pneumatic actuator system including compensation for variations in ambient temperature. Compensation is achieved by varying a position error signal in accordance with temperature before application to a valve actuator.

5 Claims, 4 Drawing Figures

TEMPERATURE COMPENSATED PNEUMATIC CONTROL SYSTEM

BACKGROUND OF THE INVENTION

1. Field of the Invention

The present invention relates to the provision of compensation for temperature effects on pneumatic control systems. More specifically, the present invention is directed to a pneumatic actuator system which incorporates an electronic gain control. Accordingly, the general objects of the present invention are to provide novel and improved methods and apparatus of such character.

2. Description of the Prior Art

While not limited thereto in its utility, the present invention is especially well suited for use in vehicle, and particularly missile, control systems. By way of example, prior art pneumatic fin actuation systems, as are conventionally employed for the steering of missiles, exhibit variations in gain as a function of gas supply pressure and ambient temperature. Such gain changes are undesirable since they may result in steering inaccuracies. Accordingly, when pneumatic actuator system frequency response requirements are closely toleranced, means must be provided to compensate for the uncontrollable variables which effect system gain.

As noted above, supply pressure and ambient temperature are the uncontrolled variables which effect the performance of a pneumatic actuator system. Deviations from the design values of pressure and temperature have a direct effect on system performance by causing variations in the flow rate of the gas used to drive the pneumatic actuators. In the prior art, compensation for variations in source gas pressure was accomplished by well-known mechanical means. However, since temperature compensation cannot be affected mechanically, control system design has largely ignored the gain changes resulting from ambient temperature variations.

Present pneumatic actuator systems, of both the open and closed loop types, typically employ an electronic subassembly which generates a position error signal for application to an electromagnetically operated control valve of a pneumatic actuator. Changes in ambient temperature will effect the overall control system gain by causing variation in both the temperature of the gas delivered to the actuator and by causing the components of the electronic package to operate at temperatures which deviate from their design values. In actual practice, the principal contribution to temperature induced pneumatic actuator control system gain variation is change in gas temperature.

As noted above, present pneumatic control system design parameters in effect require that temperature compensation be included in the system. Due in part to manufacturing inaccuracies with respect to the pneumatic and mechanical portions of an actuator system, in order to satisfy present system performance requirements the gain compensation means must be adjustable to permit variance of the relative amount of compensation employed. In the interest of flexibility, and to permit interchange of components, the temperature compensation system should preferably be capable of being employed with both torque motor-servo valve type actuators and also time modulation systems. In the interest of minimizing the additional expense of an actuator system due to the incorporation of gain compensation therein, it is also desirable that the gain compensator utilize components with "loose" tolerances. As will be obvious to those skilled in the art, the use of components with "loose" tolerances has previously been deemed inconsistent with the desire for precision.

SUMMARY OF THE INVENTION

The present invention overcomes the above briefly discussed disadvantages of the prior art by providing a temperature compensated pneumatic actuator system. In providing a pneumatic actuator system with gain compensation, the present invention meets the above briefly discussed system design requirements of adjustability, flexibility and minimum additional expense.

In accordance with the present invention, an electronic gain compensator is employed to vary the amplitude of a control signal delivered to the flow control valve of a pneumatic actuator device. The electronic gain compensator utilizes an element having a resistance which varies inversely with temperature. This temperature sensitive element, which is typically a thermistor, is physically located so as to be exposed to either the ambient atmosphere or the gas actually being supplied to the actuator. The temperature sensitive element is electrically connected into the feedback circuit of an operational amplifier so as to control the gain of the amplifier as a function of the temperature to which the temperature sensitive element is exposed. The gain compensator may also include means whereby the compensator circuit gain may be initially adjusted at a preselected temperature.

The actuator control system of the present invention, in the embodiment of the time-modulated control, also employs an oscillator and modulator in combination with the gain compensator. In the environment of a multiple actuator control, a plurality of modulators are employed and each modulator includes means for compensating for minor differences in the operating characteristics of each load device. The temperature compensator, in addition to the means for adjusting overall loop gain at the preselected temperature, may also include means which permit compensation for any offset which may result from unbalance in the oscillator waveform.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which.

DESCRIPTION OF THE PREFERRED EMBODIMENTS

Figure 1:
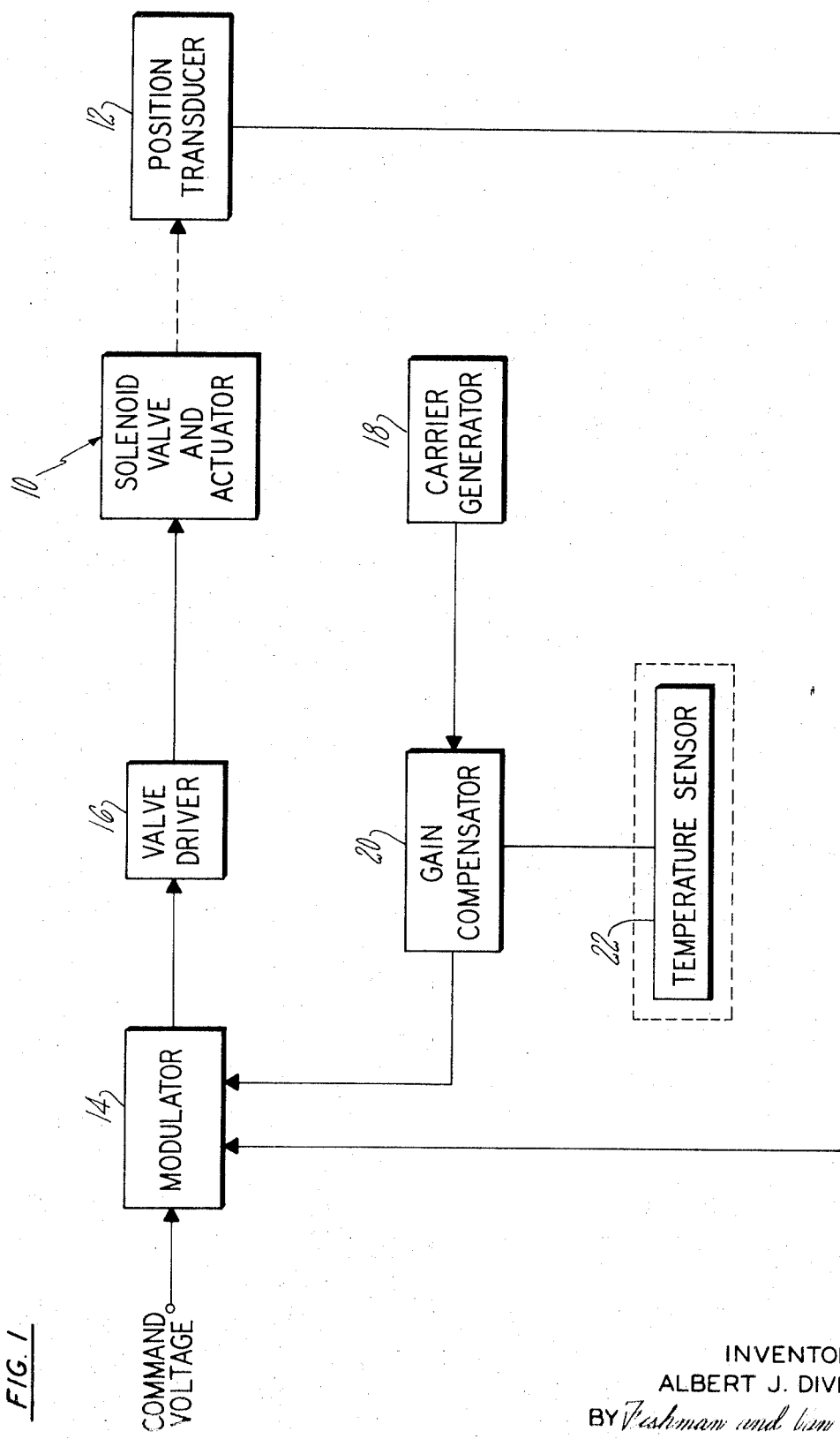
FIG. 1 is a block diagram of the present invention as embodied in a time-modulated pneumatic actuator system.

With reference now to FIG. 1, the solenoid controlled valve and its associated actuator, which comprises the mechanical subassembly of a pneumatic control system, is indicated generally at 10. The valve and actuator assembly may, for example, be the type of device shown in FIG. 4 of U. S. Pat. No. 3,521,535.

By means of a mechanical connection between actuator 10 and a position transducer 12, a feedback signal commensurate with instantaneous actuator position will be generated. Transducer 12 may, for example, comprise a potentiometer.

The feedback signal generated by transducer 12 is delivered to a modulator circuit 14. An input or command signal commensurate with the desired position of the actuator output shaft is also delivered to modulator 14. A third input to modulator 14, generated in the manner to be described below, is an alternating carrier signal which is amplitude modulated in accordance with ambient or supply gas temperature. A preferred embodiment of modulator 14 will be described below in the discussion of FIG. 2. Suffice it for the present to note that the command and feedback signals will be combined in modulator 14 to generate a position error signal and the carrier voltage will thereafter be modulated by the error signal in order to generate a duty cycle modulated valve control signal. The principles of duty cycle modulation are well known in the art and further discussion thereof is not believed necessary herein. For further information with respect to duty cycle modulation reference may be had to aforementioned U. S. Pat. No. 3,521,535 issued July 21, 1970, to J. A. Oelrich and assigned to the assignee of the present invention. The disclosure of Oelrich U. S. Pat. No. 3,521,535 is hereby incorporated by reference.

The control signal appearing at the output of modulator 14 is applied to a valve driver circuit 16. Drive circuit 16 will typically comprise a power amplifier which increases the control signal from a low power signal level to a higher power level sufficient to operate the solenoid valve.

The amplified control signal from drive circuit 16 is delivered as the input to the solenoid operated control valve in actuator 10. In the manner described in Oelrich U.S. Pat. No. 3,521,535 the control signal will cause the valve to be positioned so as the null the position error of the load on the actuator.

The embodiment of FIG. 1 also includes an oscillator or carrier voltage generator 18. Typically, and as shown in FIG. 2, the oscillator 18 comprises a sawtooth voltage generator.

The output signal provided by carrier generator 18 is applied to the gain compensator circuit 20 wherein it is modulated in accordance with a sensed temperature. The temperature sensing means 22 will, as noted above, typically comprise a thermistor. As represented in FIG. 1, temperature sensor 22 is positioned within the supply line through which gas is delivered, typically from a pressurized source such as a storage bottle, to the actuator. Where physical limitations do not permit installation of temperature sensor 22 in the gas supply line, the temperature sensor may be exposed to the ambient atmosphere. Tests have shown that compensation for approximately 80 percent of the temperature induced gain variations of the pneumatic control system may be accomplished by sensing the ambient temperature whereas almost total compensation may be achieved by sensing the operating fluid temperature.

Figure 2:
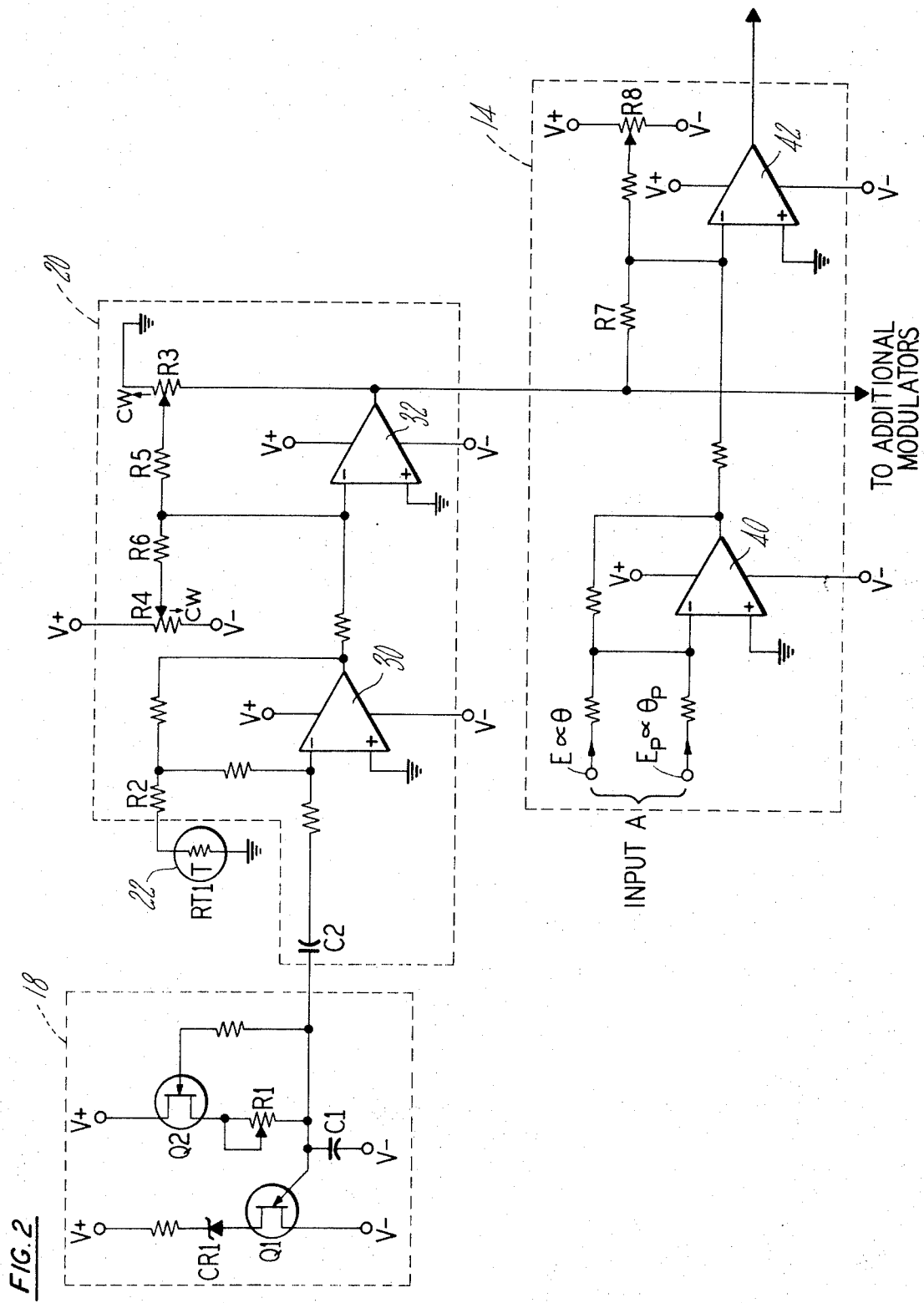
FIG. 2 is an electrical schematic showing the circuitry of a portion of the embodiment shown in block form in FIG. 1.

With reference now to FIG. 2, a schematic circuit diagram depicting the modulator 14, carrier generator 18, gain compensator 20 and temperature sensor 22 of the embodiment of FIG. 1 is presented. The carrier signal generator 18 comprises a conventional unijunction sawtooth oscillator employing unijunction transistor Q1 which causes the periodic charge and discharge of capacitor C1. The time constant of the circuit, and thus the output frequency of oscillator 18, is adjusted by means of the potentiometer R1 connected in series with capacitor C1 and field effect or bipolar transistor Q2 across the d.c. source. A Zener diode CR1 is provided for maintaining a constant frequency of the oscillator in spite of the temperature environment.

The sawtooth voltage provided by oscillator 18 is coupled, by blocking capacitor C2, to the temperature compensator 20. The temperature compensator includes a pair of cascade connected operational amplifiers 30 and 32. Operational amplifiers 30 and 32 may, for example, comprise the well-known "741" class of microelectronic operational amplifiers such as Fairchild UA741.

The feedback circuit for amplifier 30 includes series connected resistors R2 and temperature sensor 22. As shown, temperature sensor 22 is a thermistor RT1 which is connected between ground and resistor R2. The time modulated type actuator system shown in FIGS. 1 and 2 typically provides control signals for an a.c. operated poppet valve, such as valve 8 of Oelrich U. S. Pat. No. 3,521,535, in actuator 10. In the time-modulated control scheme it is necessary to increase the amplitude of the carrier with increases in temperature to thereby decrease the system loop gain with temperature increases. The connection of thermistor RT1 in the feedback circuit for amplifier 30 accomplishes this objective since the resistance presented to the circuit by the thermistor decreases with increases in temperature thereby reducing the negative feedback to the input of the amplifier 30.

The temperature compensated carrier signal appearing at the output of amplifier 30 is applied to an input of amplifier 32. The feedback circuit for amplifier 32 includes a pair of potentiometers R3 and R4. Potentiometer R3 is connected between the output of amplifier 32 and ground and the wiper arm of this potentiometer is connected back to the input of the amplifier via a fixed resistor R5. The system loop gain at a preselected temperature, typically room temperature, may be adjusted by positioning the wiper arm on potentiometer R3. The potentiometer R4 is connected across the d.c. source and the wiper arm of potentiometer R4 is connected to the input of amplifier 32 via fixed resistor R6. Potentiometer R4 may be adjusted as necessary so as to apply a positive or negative bias signal to the input of amplifier 32. This bias signal is employed to compensate for any d.c. offset resulting from unbalance or offset in the particular operational amplifier 30. In addition, it may also be used to balance the output of the operational amplifier 32.

The compensated and adjusted carrier appearing at the output of amplifier 32 is applied to the modulator circuit 14. Also applied to the modulator circuit are the command signal $E \propto \theta$ and the position feedback signal $E_p \propto \theta_p$. Both the command and position feedback signals will be direct current voltages which are applied as inputs to a summing amplifier 40. Amplifier 40 will be an operational amplifier and may be identical to amplifiers 30 and 32 of temperature compensator circuit 20. The command and position feedback signals will be compared at the input to amplifier 40 and a position error signal will appear at the amplifier output terminal. This position error signal is applied to a first input terminal of a further operational amplifier 42. The temperature compensated carrier signal is also applied, via fixed resistor R7, to the first input terminal of amplifier 42.

Amplifier 42 may also comprise an operation amplifier idential to amplifier 30. Amplifier 42 functions as an open loop, high gain summing amplifier which detects whether the magnitude of the error signal is above or below the peak amplitude of the carrier signal. Accordingly, amplifier 42 may be considered as a switch which provides either V+ or V− voltage pulses. The width of the output pulses provided by amplifier 42 is a function of the position error signal. The operation of amplifier 42 may be better understood from a consideration of the above-referenced Oelrich U. S. Pat. No. 3,521,535. A bias signal from potentiometer R8 may also be applied to the input of amplifier 42. Potentiometer R8 functions as a nulling adjustment which is employed to compensate for d.c. offset produced by the feedback transducer 12 driven off the load on the actuator.

It will be understood that in a typical pneumatic control system of the type which may be associated with a missile there will be two or four steering fins operated off of the pressurized gas source. In such utilization there will be a requisite number of modulators 12 with the temperature compensated carrier signal being supplied as an input to the output summing amplifier in each of these modulators. Each modulator would, of course, be identical to the modulator shown in FIG. 2 and the nulling adjustment R8 would be separately set for each load device.

Figure 3:
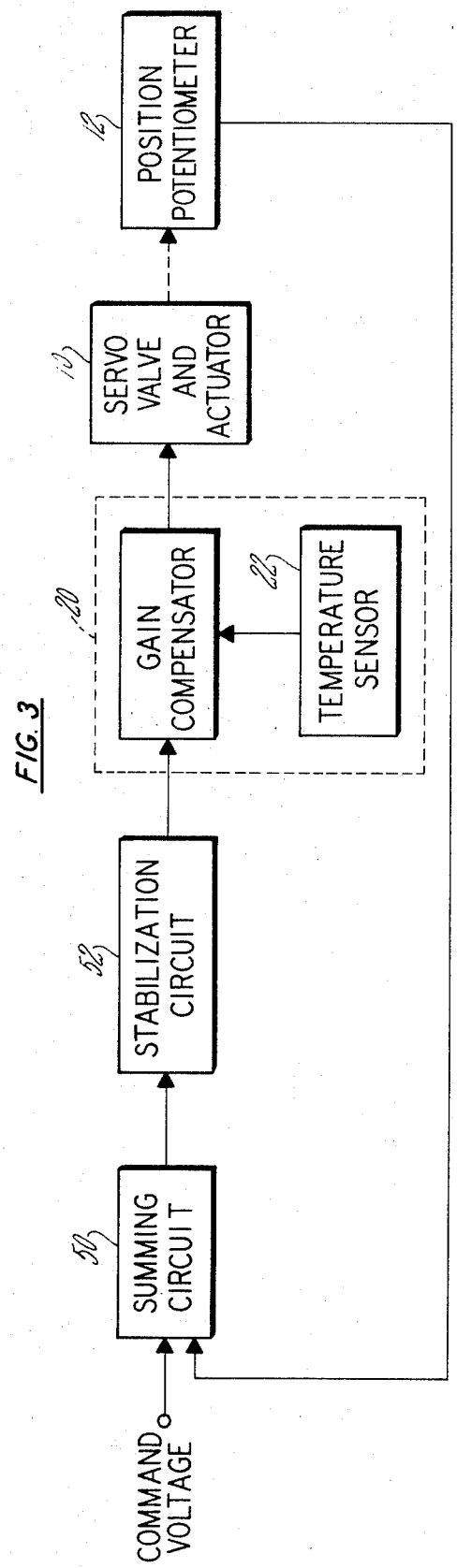
FIG. 3 is a block diagram of the present invention as embodied in a servo-valve pneumatic actuator system.

With reference now to FIG. 3, a second embodiment of the invention designed for use with an electromagnetic servo valve type pneumatic actuator system is shown in block form. In the embodiment of FIG. 3 the control valve and its associated actuator 10 would typically include a torque motor for positioning the valve. The actuator output shaft or load position will be sensed by a position transducer 12, typically a potentiometer, and the feedback signal thus generated will be delivered to the input of a summing circuit 50. The command voltage is also delivered to summing circuit 50. Summing circuit 50 generates a position error signal which is either applied directly to the compensator circuit 20 or applied to compensator 20 via a stabilization circuit 52. Stabilization circuit 52 is optional and if employed would comprise a signal conditioning network; such as a lead circuit, lag circuit, notch filter, or other requisite circuitry; designed to achieve close position accuracy without instability in the actuator.

The second input to compensator circuit 20 is, of course, a signal commensurate with a sensed temperature as provided by the temperature sensing means 22. In the FIG. 3 embodiment the temperature sensing means is represented as being exposed to the ambient atmosphere rather than being in an operating fluid supply line. In the FIG. 3 embodiment the signal developed by temperature sensor 22 is employed to control the amplitude of the error signal generated by summing circuit 50 in such a manner that the error signal will be amplified with decreases in ambient temperature and will be attenuated for increases in the ambient temperature above the set point of the circuit.

Figure 4:
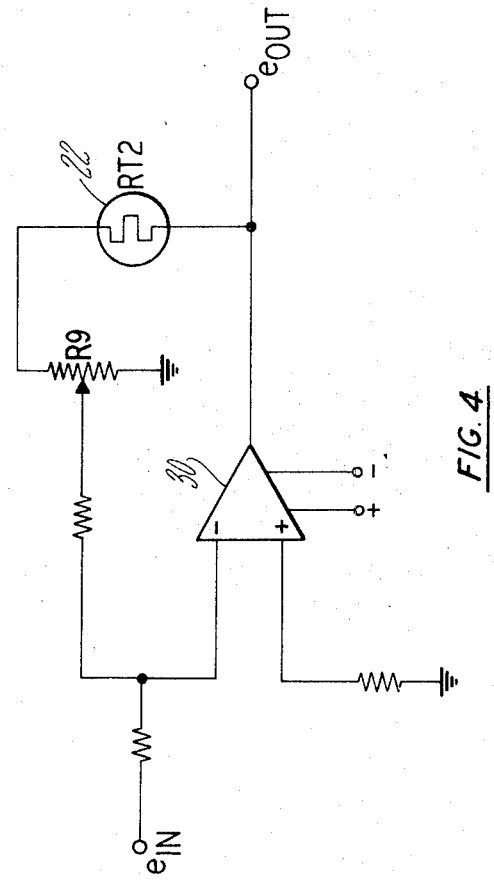
FIG. 4 is an electrical schematic depicting the temperature compensator circuit of the embodiment of FIG. 3.

FIG. 4 depicts the actual circuitry of compensator 20 of the embodiment of FIG. 3. The circuit of FIG. 4 differs from the compensator described above in the discussion of FIG. 2 in only one significant aspect. In the FIG. 4 embodiment the thermistor RT2 is connected directly in the feedback path between the output and input of amplifier 30 whereas the thermistor RT1 of the FIG. 2 embodiment is employed to shunt a portion of the negative feedback signal to ground. Since the servo valve of the FIG. 3 embodiment will typically of the spool type the desired temperature compensation effect is achieved in the opposite manner when compared to the FIG. 1 embodiment. That is, in both embodiments the object is to vary the system loop gain inversely with temperature but with the FIG. 1 embodiment this was accomplished by increasing the amplitude of the carrier signal directly with temperature. In the FIG. 3 embodiment, however, the gain of amplifier 30 is decreased proportionally with increases in temperature, and vice versa, by connecting the temperature sensitive element, which exhibits a change in resistance inversely proportional to temperature, directly in the feedback path of the operational amplifier.

In the embodiment of FIGS. 3 and 4, as in the embodiment of FIGS. 1 and 2, means are provided for setting the control loop gain at a preselected temperature which typically will be room temperature. In the FIG. 4 embodiment this is accomplished by means of potentiometer R9 which is in the feedback path of amplifier 30. In the temperature compensator shown in FIG. 2, loop gain was set by a control, that is potentiometer R3, connected to the compensator circuit "downstream" of amplifier 30 and this technique could, of course, alternatively be employed in the embodiment of FIGS. 3 and 4.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. In a pneumatic control system, the system including a source of operating gas and electrically actuated flow control valve means for regulating the delivery of gas from the source to a load, means providing compensation for the effects of variation in temperature on the system comprising:

means responsive to input signals commensurate with the actual and desired positions of a pneumatically operated load on the system for generating a position error signal;

temperature sensitive means, said temperature sensitive means providing an output having electrical characteristics which vary with temperature;

oscillator means for generating an alternating signal;

amplifier means;

means for applying the signal provided by said oscillator means to said amplifier means;

means connecting said temperature sensitive means in a feedback circuit for said amplifier means whereby the amplitude of the output signal provided by said oscillator means is varied in accordance with the electrical characteristics of the output of said temperature sensitive means;

switch means responsive to said position error signal and to said amplitude variable oscillator output signal for providing output signals having a duration and polarity commensurate with the position error compensated for variation from a preselected temperature; and means for applying the output signals provided by said switch means to said electrically actuated flow control valve means.

2. The apparatus of claim 1 wherein said temperature sensitive means is exposed to the ambient atmosphere.

3. The apparatus of claim 1 wherein said temperature sensitive means is exposed to the system operating gas.

4. The apparatus of claim 2 wherein said temperature sensitive means comprises:
a thermistor.

5. The apparatus of claim 3 wherein said temperature sensitive means comprises:
a thermistor.

* * * * *